US011247422B2

(12) United States Patent
Grespan et al.

(10) Patent No.: US 11,247,422 B2
(45) Date of Patent: Feb. 15, 2022

(54) OPTICAL ELEMENT FABRICATION WITH OPTICAL SCANNER FEEDBACK

(71) Applicant: Facebook Technologies, LLC, Menlo Park, CA (US)

(72) Inventors: Silvio Grespan, Santa Clara, CA (US); Aiqing Chen, Fremont, CA (US)

(73) Assignee: Facebook Technologies, LLC, Menlo Park, CA (US)

( * ) Notice: Subject to any disclaimer, the term of this patent is extended or adjusted under 35 U.S.C. 154(b) by 121 days.

(21) Appl. No.: 16/554,024

(22) Filed: Aug. 28, 2019

(65) Prior Publication Data

US 2020/0122417 A1 Apr. 23, 2020

Related U.S. Application Data

(60) Provisional application No. 62/748,644, filed on Oct. 22, 2018.

(51) Int. Cl.
*B29D 11/00* (2006.01)
*G02B 5/30* (2006.01)

(52) U.S. Cl.
CPC .. *B29D 11/00788* (2013.01); *B29D 11/00644* (2013.01); *B29D 11/00961* (2013.01); *G02B 5/3041* (2013.01)

(58) Field of Classification Search
CPC ........ B29D 11/00788; B29D 11/00644; B29D 11/00961; G02B 5/3041
See application file for complete search history.

(56) References Cited

U.S. PATENT DOCUMENTS

| 6,520,056 B1 | 2/2003 | Nemeth et al. |
| 2004/0169809 A1 | 9/2004 | Yamabuchi et al. |
| 2010/0004773 A1* | 1/2010 | Kochergin ........... G01N 21/211 700/103 |
| 2018/0215060 A1 | 8/2018 | Johnson et al. |

FOREIGN PATENT DOCUMENTS

| JP | 2001-047394 | * | 2/2001 |
| JP | 2013161031 A | | 8/2013 |
| JP | 2017068106 A | | 4/2017 |

OTHER PUBLICATIONS

International Searching Authority, Patent Cooperation Treaty, European Application No. PCT/US2019/056452, Notification dated Feb. 5, 2020, 4 pages.
International Searching Authority, Patent Cooperation Treaty, Written Opinion of the International Searching Authority, European Application No. PCT/US2019/056452, Notification dated Feb. 5, 2020, 7 pages.

* cited by examiner

*Primary Examiner* — Mathieu D Vargot
(74) *Attorney, Agent, or Firm* — Freestone Intellectual Property Law PLLC; Aaron J. Visbeek; William J. Pigott

(57) ABSTRACT

A computer-implemented method for optical element fabrication with optical scanner feedback includes initiating the optical scanner to obtain an optical measurement of an optical layer of a multi-layer film. A rotational orientation for an optical element that is to be cut from the multi-layer film is then determined based on the optical measurement. The method also includes initiating a cutting instrument to cut the optical element from the multi-layer film at the rotational orientation.

16 Claims, 6 Drawing Sheets

OPTICAL ELEMENT FABRICATION WITH OPTICAL SCANNER FEEDBACK

CROSS-REFERENCE TO RELATED APPLICATION

The present Application claims the benefit of U.S. Provisional Application No. 62/748,644, entitled "Optical Element Fabrication with Optical Angle Scanner Feedback" filed Oct. 22, 2018. U.S. Provisional Application No. 62/748,644 is expressly incorporated herein by reference in its entirety.

FIELD OF DISCLOSURE

Aspects of the present disclosure relate generally to the fabrication of optical elements, and in particular but not exclusively, relate to the fabrication of optical elements with optical scanner feedback.

BACKGROUND

A variety of optical elements may be formed from optical films. For example, an optical filter, such as a polarizer may be formed from an optical film that allows light of a specific polarization to pass through while blocking light of other polarizations. In another example, a waveplate or retarder may be formed from an optical film that alters the polarization state of the light propagating through it.

The fabricated optical elements may be incorporated into a variety of optical systems, such as those found in electronic displays, large-diameter optics, and/or small-diameter optics. For example, an optical element may be incorporated into the lighting layer and/or display layer of a liquid crystal display (LCD), into an ophthalmic lens for passing/focusing light to the eye of a user, and/or into a lens of a camera.

The optical films may be manufactured as large sheets or rolls of material, from which, multiple optical elements may be cut. However, the optical films may include an optical axis that dictates the polarization and/or retardation properties of the optical film. Accordingly, the orientation of the optical element as it is cut from the optical film will dictate the optical axis of the optical element, itself.

BRIEF DESCRIPTION OF THE DRAWINGS

Non-limiting and non-exhaustive aspects of the present disclosure are described with reference to the following figures, wherein like reference numerals refer to like parts throughout the various views unless otherwise specified.

DETAILED DESCRIPTION

Various aspects and embodiments are disclosed in the following description and related drawings to show specific examples relating to optical element fabrication with optical scanner feedback. Alternate aspects and embodiments will be apparent to those skilled in the pertinent art upon reading this disclosure and may be constructed and practiced without departing from the scope or spirit of the disclosure. Additionally, well-known elements will not be described in detail or may be omitted so as to not obscure the relevant details of the aspects and embodiments disclosed herein.

As mentioned above, multiple optical elements may be cut from a large sheet or roll of optical film. A system for fabricating optical elements may be configured to receive the sheet or roll of optical film from which multiple optical elements are cut. However, the incoming sheet or roll of optical film may have an optical axis that varies from batch to batch or may even vary within the same roll. These variations may be due to tolerances and/or manufacturing variations of the incoming optical film. These variations may translate to inaccuracies and/or variations in the optical axis of the optical elements that are fabricated by some conventional fabrication systems.

Accordingly, aspects of the present disclosure provide a method, computing device, and system for optical element fabrication that includes optical scanner feedback. That is, as will be described in more detail below, a fabrication system may include a scanning stage that obtains optical measurements of the optical film as the film is fed through the system. These optical measurements may then be provided to a cutting stage to make real-time adjustments to the rotational orientation of the optical elements being cut from the optical film.

Figure 1:
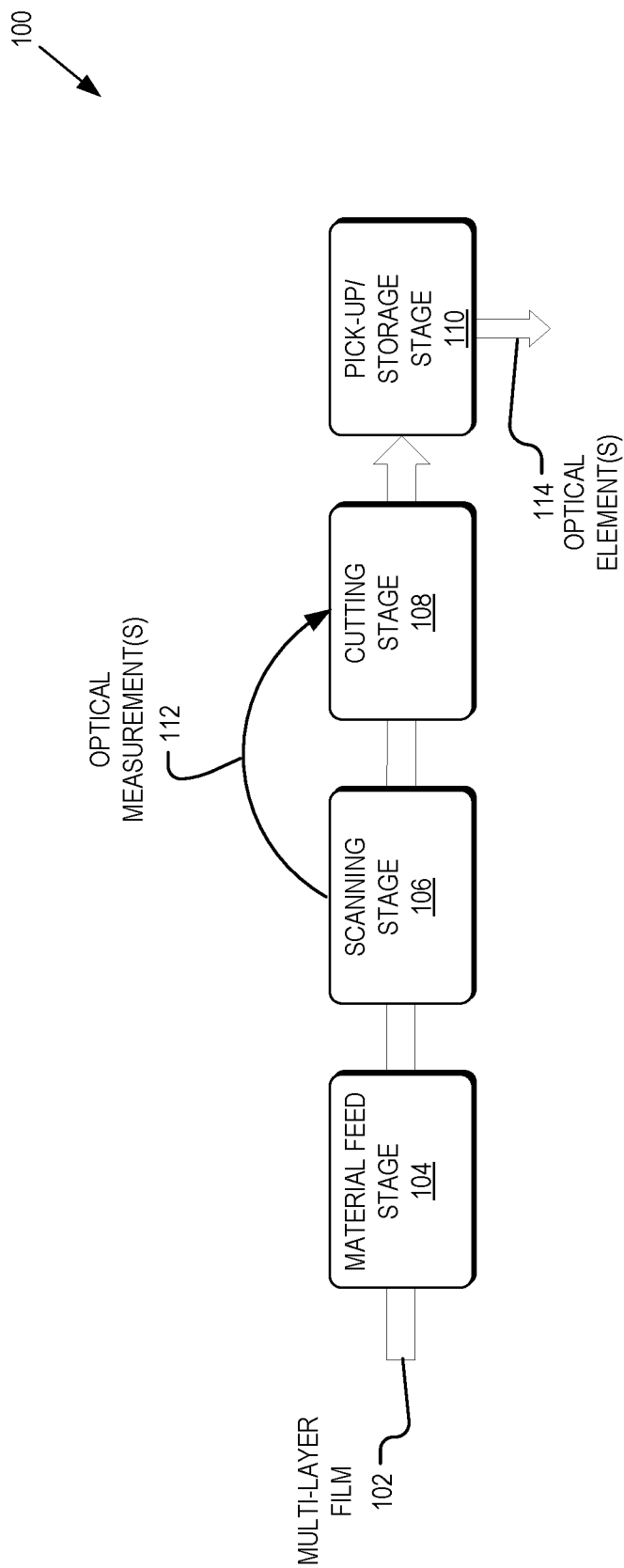
FIG. 1 illustrates a system for the fabrication of optical elements, in accordance with aspects of the present disclosure.

By way of example, FIG. 1 illustrates a system 100 for the fabrication of optical elements, in accordance with aspects of the present disclosure. System 100 is shown as including a material feed stage 104, a scanning stage 106, a cutting stage 108, and a pick-up/storage stage 110.

FIG. 1 also illustrates an incoming multi-layer film 102 that is provided to the system 100. In some examples, multi-layer film 102 includes one or more optical layers and one or more liner layers. The one or more optical layers may be thin optical films that include an optical axis that dictates the optical properties of the optical layer, such as its polarization and/or retardation properties. The multi-layer film 102 may also include one or more liner layers that are adhered to the optical layer to protect the optical layer from damage during the fabrication process. In some examples, the multi-layer film 102 includes a top liner layer adhered to a top surface of the optical layer and a bottom liner layer adhered to a bottom surface of the optical layer. In some aspects, the multi-layer film 102 may include an optional adhesive layer, such as an optically clear adhesive (OCA). The adhesive layer may be utilized after fabrication of the optical element for the subsequent optical binding of the optical element to other optical elements and/or devices.

As shown in FIG. 1, the multi-layer film 102 is provided to the material feed stage 104. In some aspects, the material feed stage 104 may include an input roll holder for holding an incoming roll of the multi-layer film 102. The input roll holder may be configured to hold the roll of multi-layer film 102 based on specified measurements of the inner roll core as well as the maximum external diameter of the roll. In some embodiments, the multi-layer film 102, and thus the roll of multi-layer film 102, may have a width of approximately 400 mm.

The material feed stage 104 may also include a tensioning system configured to keep the multi-layer film 102 flat across the various stages of system 100. In some aspects, the tensioning system is designed to minimize deformation of the multi-layer film 102 as it is advanced through the system 100.

The material feed stage 104 is configured to advance the multi-layer film 102 to the scanning stage 106, which then obtains one or more optical measurements 112 of the optical layer of the multi-layer film 102. In some examples, the scanning stage 106 includes one or more optical scanners configured to obtain the optical measurements 112 of the optical layer. As will be described further below, the optical scanner may be configured to generate a beam of light that is incident upon the optical layer but not the liner layer of the multi-layer film 102. In some examples, the liner layer may include cutouts and/or openings that allow the optical scanner to obtain the optical measurements 112 of the optical layer without the beam of light being incident upon the liner layer.

In some examples, the optical scanner, included in the scanning stage 106, is a polarimeter that is configured to measure the polarization properties of the optical layer of the multi-layer film 102. In this case, the optical measurements 112 may include a Mueller matrix, from which an optical axis of the optical layer may be derived. In some aspects, the optical axis is a polarization axis and/or a retardation axis of the optical layer. The polarization axis may be the fast axis, the slow axis, or the absorption axis of the optical layer. The retardation axis may represent the in-plane retardation (RO) or the thickness-direction retardation (Rth) of the optical layer. In addition, the optical measurements 112 may represent the angle of orientation, ellipticity, and/or hardness for right/left circular light of the optical layer. Even still, the optical measurements 112 may represent the depolarization, retardant and/or diattenuation of the optical layer.

As shown in FIG. 1, the optical measurements 112 are then provided to the cutting stage 108. The material feed stage 104 may then advance the multi-layer film 102 such that a region of the multi-layer film 102 that corresponds to the optical measurements 112 is now aligned with the cutting stage 108. The cutting stage 108 may include one or more cutting instruments configured to cut an optical element from the multi-layer film 102 based, in part, on the optical measurements 112. In some aspects, the cutting instrument included in the cutting stage 108 is a laser cutting system or other suitable cutting instrument, such as a die cutter.

The cutting instrument, of the cutting stage 108, may then cut the optical element from the multi-layer film 102 at a rotational orientation that is determined based on the optical measurements 112. For example, the optical element that is to be cut from the multi-layer film 102 may have a desired optical axis with respect to a desired shape of the optical element. Accordingly, the cutting stage 108 may adjust, in terms of rotational angle, the cutting of the multi-layer film 102 based on the optical measurements 112 to produce an optical element that has the desired shape with the desired optical axis. In some embodiments, the scanning stage 106 is configured to generate optical measurements 112 for each optical element that is to be cut by the cutting stage 108, such that the cutting stage 108 may make continual adjustments to the rotational orientation as the multi-layer film 102 is advanced through the system 100.

After the optical element is cut from the multi-layer film 102 at the cutting stage 108, the material feed stage 104 may advance the multi-layer film 102 to the pick-up/storage stage 110. In some examples, the pick-up/storage stage 110 is configured to pick-up the cut optical elements 114 and transfer them to a storage container for future use (e.g., assembly into an optical system). In some examples, the pick-up/storage stage 110 may include a vacuum apparatus or suction cup to pick-up and transport the cut optical elements 114. The pick-up/storage stage 110 may also include a roll holder for storing the waste part of the roll of the multi-layer film 102. In some examples, the roll holder works in concert with the tensioning system of the material feed stage 104 to maintain appropriate tensioning of the multi-layer film 102.

Figure 2:
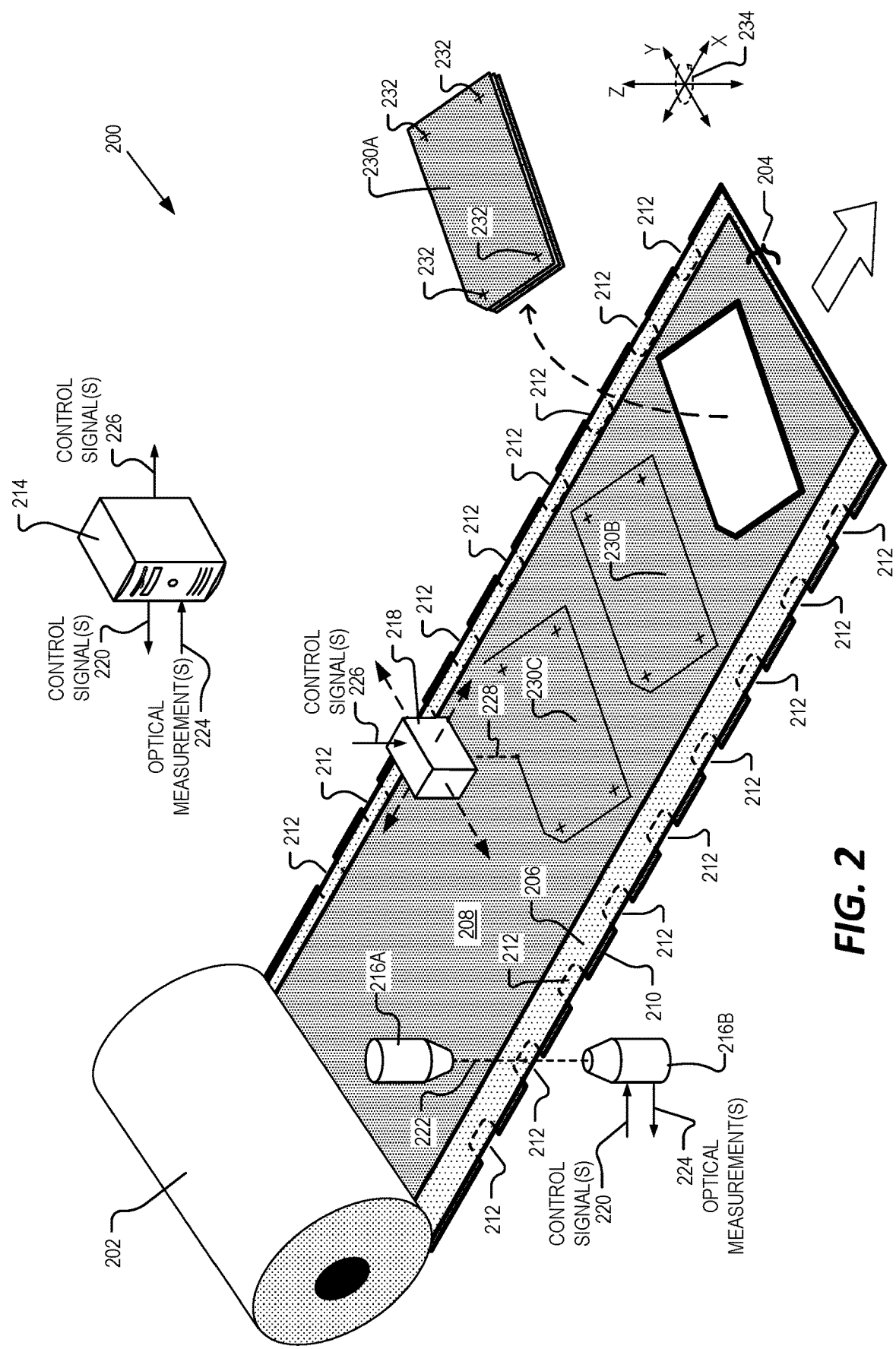
FIG. 2 illustrates another system for the fabrication of optical elements, in accordance with aspects of the present disclosure.

FIG. 2 illustrates another system 200 for the fabrication of optical elements, in accordance with aspects of the present disclosure. System 200 is illustrated as including a roll 202 of a multi-layer film 204, a computing device 214, an optical transmitter 216A and an optical receiver 216B (collectively referred to herein as an optical scanner 216), and a cutting instrument 218. The illustrated example of multi-layer film 204 is shown as including an optical layer 206, a top liner layer 208, and a bottom liner layer 210.

In some aspects, system 200 is designed to be located within a clean-room with an air filtration system to prevent contamination of the multi-layer film 204 and optical elements (e.g., optical elements 230A-C) during fabrication. For example, system 200 may be located within a class 1000 clean-room with an efficiency particulate air (EPA) filter that employs laminar airflow principles. System 200 is one possible implementation of system 100 of FIG. 1, where optical scanner 216 corresponds to scanning stage 106 and cutting instrument 218 corresponds to cutting stage 108. Features that correspond to the material feed stage 104 and the pick-up/storage stage 110 are not explicitly illustrated in FIG. 2 for ease of explanation.

As shown in FIG. 2, the bottom liner layer 210 of the multi-layer film 204 may include several cutouts 212. The cutouts 212 are located on the bottom liner layer 210 to expose the optical layer 206 for scanning by the optical scanner 216. For example, optical scanner 216 may be configured to generate a beam of light 222 to obtain the optical measurements 224. As shown in FIG. 2, the beam of light 222 is incident upon the optical layer 206, but not the bottom liner layer 210 due to the presence of cutout 212. In other examples, the cutouts 212 may be patterned within a middle region of the bottom liner layer 210 and/or the top liner layer 208. In some aspects, the size of each cutout 212 is configured to be larger than a diameter of the beam of light 222 (e.g., beam of light 222 may have a beam diameter of about 3 mm). In some embodiments, the optical scanner 216 may operate at multiple wavelengths. That is, beam of light 222 may be ultraviolet (UV) light, visible light, near infrared light, and/or infrared light.

In some implementations, optical scanner 216 is mounted on a single axis rail to allow movements of the optical scanner 216 across the multi-layer film 204 between the left and right edges (e.g., along the y-axis as shown in FIG. 2). In this example, the optical scanner 216 may be configured to generate multiple optical measurements 224 for each optical element that is to be cut. For example, the optical scanner 216 may generate a first optical measurement by directing the beam of light 222 through a cutout 212 at a first edge of the optical layer 206. The optical scanner 216 may then be moved across the multi-layer film 204 to direct the beam of light 222 through another cutout at a second edge of the optical layer 206 to obtain a second optical measurement. The two optical measurements may then be averaged to generate an average optical measurement, which is then provided to the computing device 214 to determine an optical axis of the optical layer 206 for cutting a respective optical element.

In some examples, the cutouts 212 are located in the bottom liner layer 210 such that they are aligned with the optical scanner 216 as the multi-layer film 204 is advanced though the system 200. In one embodiment, the system 200 is configured to advance the multi-layer film 204 in stepwise increments such that the optical scanner 216 is aligned with at least one cutout 212 each time the multi-layer film 204 is advanced. In another example, the system 200 may include a vision system, such as video camera, to detect and align the cutouts 212 with the optical scanner 216 as the multi-layer film 204 is advanced. In some embodiments, one or more of the layers of the multi-layer film 204 may include fiducial markers that are detectable by the system 200 to provide alignment between the optical scanner 216 and the cutouts 212. The optical scanner 216 may be configured to obtain the optical measurements 224 of the optical layer 206 in response to one or more control signals 220 generated by the computing device 214.

In the illustrated example, the optical scanner 216 is arranged vertically, with the optical transmitter 216A and the optical receiver 216B located on opposite sides (e.g., top and bottom sides) of the multi-layer film 204 such that the beam of light 222 is transmitted through the optical layer 206. Thus, in some examples, the optical measurements 224 that are generated by the optical scanner 216 may be referred to as transmission measurements of the optical layer 206. In other examples, the optical scanner 216 is arranged in a "V-shape," where both the optical transmitter 216A and the optical receiver 216B are located on the same side of the multi-layer film 204 such that the beam of light 222 reflects off the optical layer 206. In this example, the optical measurements 224 may be referred to as reflection measurements of the optical layer 206.

As shown in FIG. 2, the optical measurements 224 are provided to the computing device 214, which may then determine an optical axis of the optical layer 206 based on the optical measurements 224. As discussed above, the determined optical axis may be a polarization axis and/or a retardation axis of the optical layer 206. In some implementations, computing device 214 may determine the optical axis of the optical layer 206 to within an accuracy of ±0.004 degrees to ±0.01 degrees.

In response to determining the optical axis of the optical layer 206, the computing device 214 may then determine a rotational orientation 234 for an optical element that is to be cut from the multi-layer film 204. As will be discussed below, the rotational orientation 234 of the optical element, as it is cut from the multi-layer film 204, dictates the optical axis of the resulting optical element.

As shown in FIG. 2, the computing device 214 then sends one or more control signals 226 to the cutting instrument 218 to cut an optical element from the multi-layer film 204 at the determined rotational orientation 234. As shown in the illustrated example, cutting instrument 218 is a laser cutting instrument that generates a laser 228 to cut through all layers of the multi-layer film 204. In one aspect, the cutting instrument 218 is moveable via a computer numerical control (CNC) positioner. The CNC positioner may be a motorized maneuverable platform that is controlled by one or more control signals 226 generated by a computing device 214. In some examples, the CNC positioner is configured to move cutting instrument 218 to various locations and/or depths. In some embodiments, the CNC positioner may include one or more direct-drive stepper motors or servo motors in order to provide highly accurate movements of the cutting instrument 218 along multiple axes (e.g., X, Y, and Z axes).

As mentioned above, the rotational orientation 234 of the optical element, as it is cut from the multi-layer film 204, dictates the optical axis of the resulting optical element. Thus, in the illustrated example, each of the optical elements 230A, 230B, and 230C may have the same optical axis, yet each may have been cut at a different rotational orientation 234, due to variances in the measured optical axis of the optical layer 206 as the multi-layer film 204 was advanced through the system 200.

In some embodiments, the cutting instrument 218 is also configured to cut and/or engrave one or more alignment marks on each optical element. For example, optical element 230A is shown as having four alignment marks 232. In some examples, the alignment marks 232 are with reference to the optical axis of the optical element 230A and provide a mechanism for aiding in the subsequent assembly of optical element 230A into an optical system. For example, alignment marks 232 may subsequently be detected and/or aligned with other optical elements and/or devices using a computer-vision system, such as a video camera for assembly.

In some implementations, one or more of the stages of system 200 may be configured to operate in parallel. For example, the optical scanner 216 may be configured to measure the optical layer 206 to generate optical measurements 224, while simultaneously, the cutting instrument 218 cuts an optical element from the multi-layer film 204 based on a previous optical measurement 224. A pick-up/storage stage (e.g., pick-up/storage stage 110 of FIG. 1) may also be configured to operate in parallel, picking up already-cut optical elements while additional optical elements are being cut by the cutting instrument 218.

In some implementations, system 200 includes a vacuum system for securing the multi-layer film 204 as the multi-layer film 204 advances through the multiple fabrication stages. In one example, the vacuum system may be split into sections, each corresponding to a respective fabrication stage and each section independently controlled. For example, the vacuum system may be configured to hold the multi-layer film 204 during the scanning stage, during the cutting stage, and then release the cut optical element only once it reaches the pick-up/storage stage.

Figure 3:
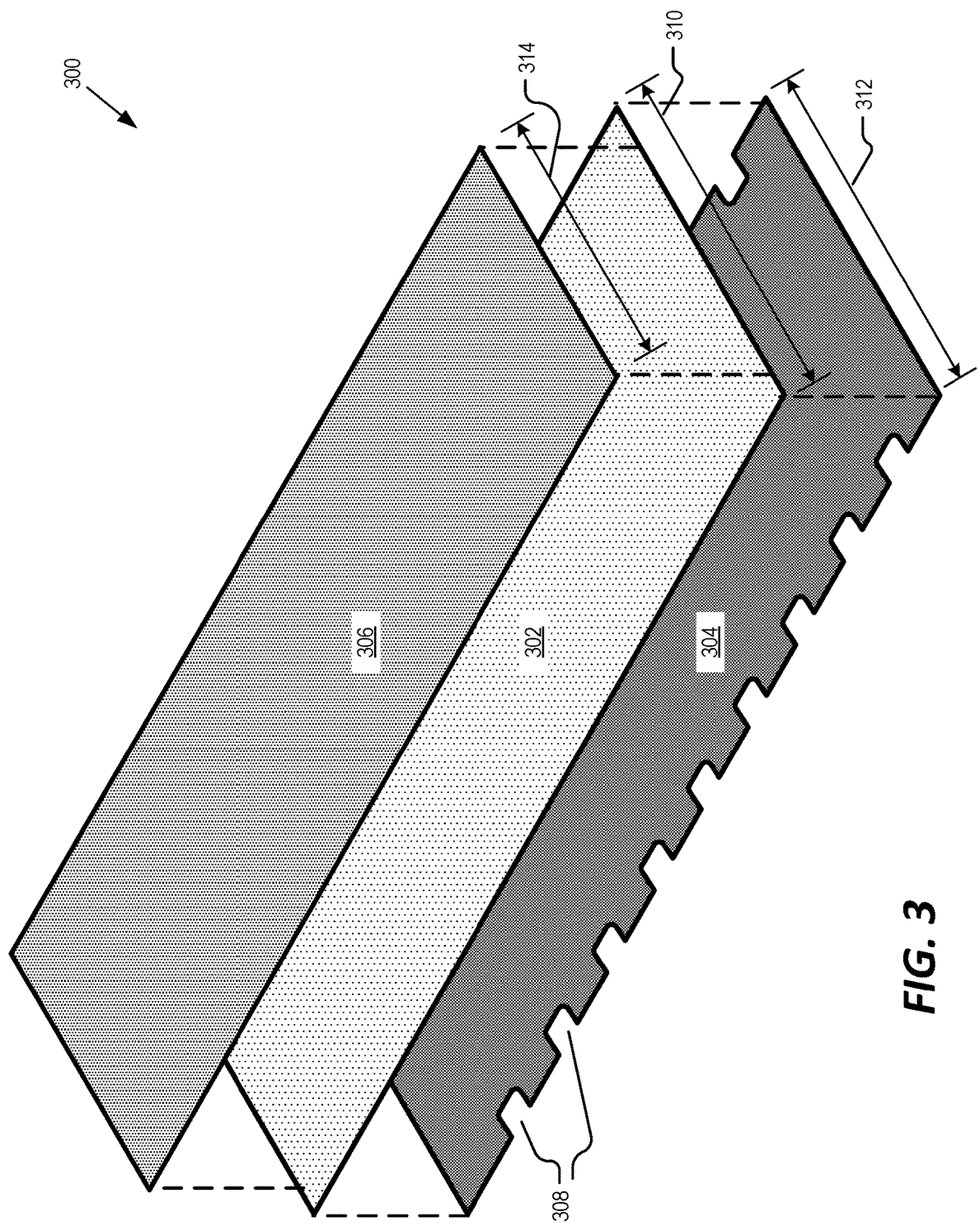
FIG. 3 illustrates a multi-layer film, in accordance with aspects of the present disclosure.

FIG. 3 is an exploded view of a multi-layer film 300, in accordance with aspects of the present disclosure. Multi-layer film 300 is one possible example of any of the multi-layer films discussed herein, including the multi-layer film 102 of FIG. 1, and/or the multi-layer film 204 of FIG. 2. The illustrated example of multi-layer film 300 is shown as including an optical layer 302, a bottom liner layer 304, and a top liner layer 306.

The optical layer 302 may be a thin optical film that includes an optical axis that dictates the optical properties of the optical layer 302, such as its polarization and/or retardation properties. Although FIG. 3 illustrates multi-layer film 300 as including a single optical layer 302, in other examples, the multi-layer film 300 may include multiple optical layers, such as two or more.

FIG. 3 also illustrates the multi-layer film 300 as including a bottom liner layer 304 and a top liner layer 306. In some examples, the liner layers are configured to protect the optical layer 302 during fabrication of the optical elements (e.g., as the optical elements are cut from the optical layer 302). Thus, in some aspects, the bottom and top liner layers 304/306 may be removable (e.g., removable prior to assembling the optical element into an optical system).

The multi-layer film 300 may also include an optional adhesive layer (not shown in FIG. 3), such as an optically clear adhesive (OCA), that is disposed between the optical layer 302 and the top liner layer 306. The adhesive layer may be utilized after fabrication of the optical element for the subsequent optical binding of the optical element to other optical elements and/or devices.

As shown in FIG. 3, the bottom liner layer 304 may have a width 312 that is the same or greater than a width 310 of the optical layer 302. Thus, in addition to protecting the optical layer 302 during the fabrication of optical elements, the bottom liner layer 304 may also be configured to provide structural support of the optical layer 302 during the fabrication and/or assembly process. Furthermore, bottom liner layer 304 is shown as including a plurality of cutouts 308, which are positioned on the bottom liner layer 304 to expose regions of the optical layer 302 for optical scanning. The top liner layer 306 is shown as including a width 314 that is less than the width 310 of the optical layer 302. In some examples, the top liner layer 306 has a width 314 that is less than the width 310 to further expose the regions of the optical layer 302 for the optical scanning.

Figure 4A:
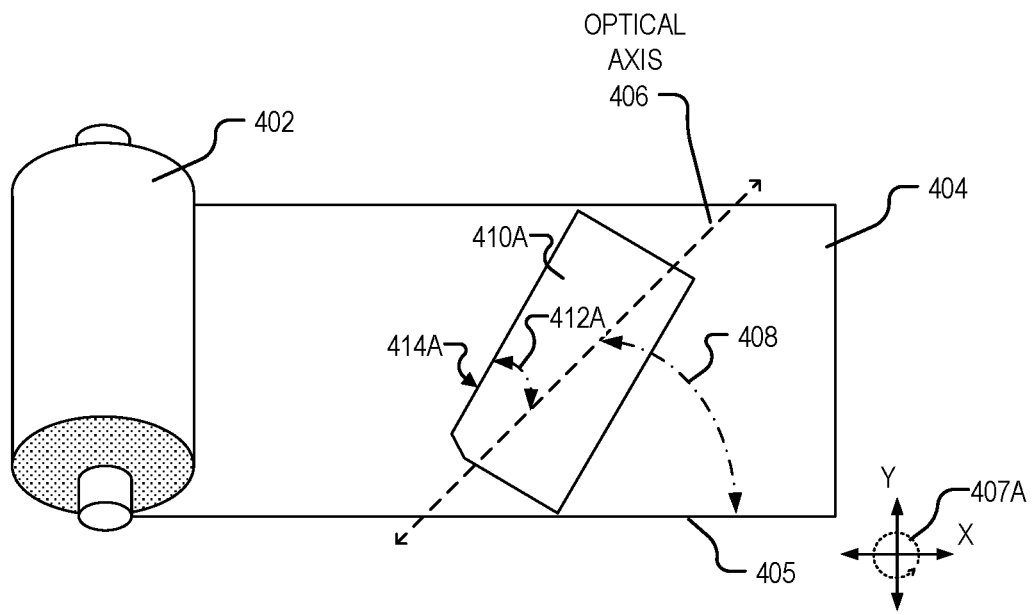
FIGS. 4A and 4B illustrate the rotational orientation of optical elements fabricated from a multi-layer film, in accordance with aspects of the present disclosure.
Figure 4B:
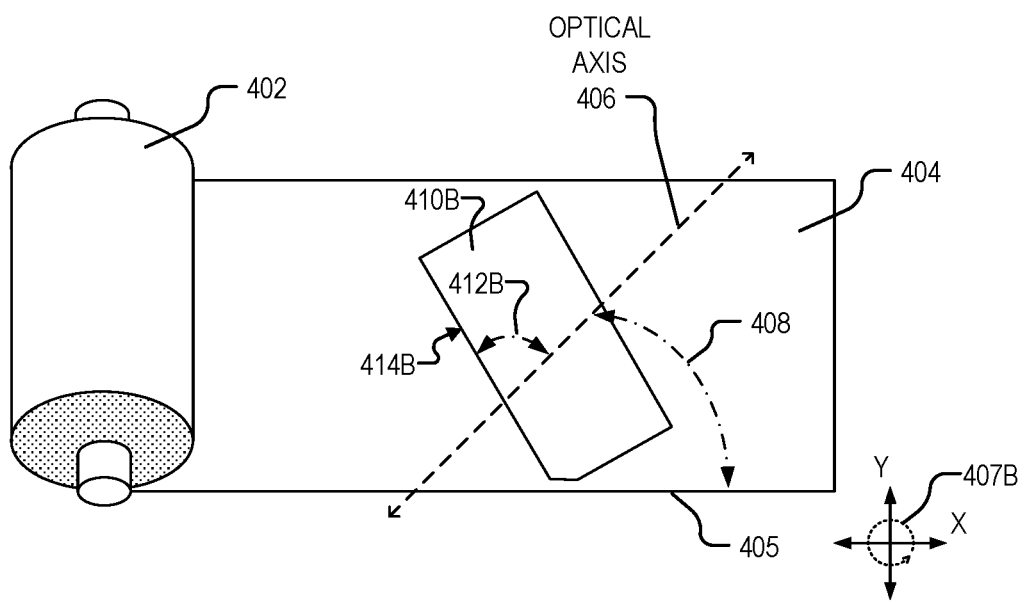

FIGS. 4A and 4B illustrate the rotational orientations 407A/407B of optical elements 410A/410B, respectively, fabricated from a multi-layer film 404, in accordance with aspects of the present disclosure. Multi-layer film 404 may represent any of the multi-layer films discussed herein, including the multi-layer film 102 of FIG. 1, the multi-layer film 204 of FIG. 2, and/or the multi-layer film 300 of FIG. 3. Similarly, the optical elements 410A and 410B are possible examples of optical elements fabricated by any of the systems discussed herein, including system 100 of FIG. 1 and/or system 200 of FIG. 2.

As shown in FIGS. 4A and 4B, optical elements 410A and 410B are cut from a roll 402 of multi-layer film 404 that includes an optical axis 406. In some aspects, an angle of the optical axis 406 is with respect to a reference edge of the multi-layer film 404. For example, FIGS. 4A and 4B illustrate an optical axis 406 that is at an angle 408 with respect to reference edge 405. However, in some instances, an optical element may be desired that has an optical axis that is at an angle different from the angle 408 of the multi-layer film 404. For example, optical element 410A is shown as having a rotational orientation 407A that results in the optical axis 406 being at an angle 412A with respect to a reference edge 414A of the optical element 410A. Similarly, optical element 410B is shown as having a rotational orientation 407B that results in the optical axis 406 being at an angle 412B with respect to the reference edge 414B of the optical element 410B. In some examples, angle 412A is different from angle 412B to produce optical elements from the same roll 402 of multi-layer film 404 that correspond to both left-eye and right-eye optical elements of a binocular vision system (e.g., a head-mounted device).

In some implementations, the incoming roll 402 may specify the angle 408 of the optical axis 406 with respect to reference edge 405. However, as mentioned above, the angle 408 may vary from roll to roll and/or may vary within the same roll 402 due to manufacturing tolerances and/or other discrepancies. For example, the angle 408 of the optical axis 406 for roll 402 may be specified as 45 degrees±1 degree.

However, requirements for the optical elements 410A and 410B may be for an optical axis that is more accurate than the ±1 degree provided by the roll 402. Accordingly, utilizing a system, such as system 100 of FIG. 1 and/or system 200 of FIG. 2, aspects of the present disclosure provide for the precise and continual measurement of the actual optical axis of the optical layer as optical elements are fabricated. In some examples, the system 100 and system 200 are configured to continually determine the optical axis of the optical layer to within an accuracy of between 0.1 degrees and 0.004 degrees, depending, in part, on the configuration of various components of the system.

In the illustrated example of FIG. 4A, the angle 412A of the optical axis 406 with respect to the reference edge 414A of the optical element 410A is 14.8 degrees. Similarly, with reference to FIG. 4B, the angle 412B of the optical axis 406 with respect to the reference edge 414B of the optical element 410B is 73.7 degrees.

Figure 5:
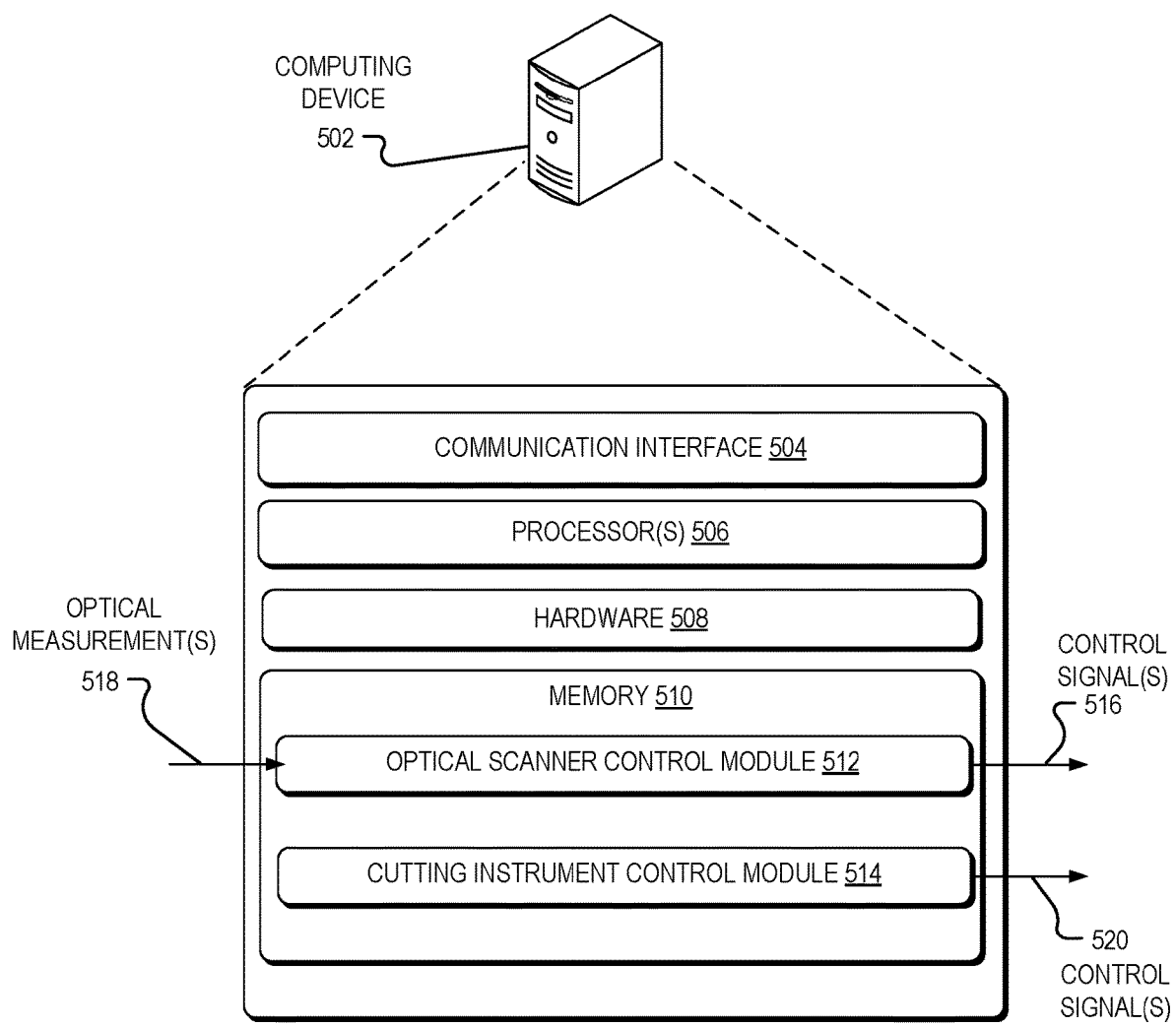
FIG. 5 illustrates an example computing device for the fabrication of optical elements, in accordance with aspects of the present disclosure.

FIG. 5 illustrates an example computing device 502 for the fabrication of optical elements, in accordance with aspects of the present disclosure. Computing device 502 is one possible implementation of the computing device 214 of FIG. 2. The illustrated example of computing device 502 is shown as including a communication interface 504, one or more processors 506, hardware 508, and a memory 510.

The communication interface 504 may include wireless and/or wired communication components that enable the computing device 502 to transmit data to and receive data from other networked devices. The hardware 508 may include additional hardware interface, data communication, or data storage hardware. For example, the hardware interfaces may include a data output device (e.g., electronic display, audio speakers), and one or more data input devices.

The memory 510 may be implemented using non-transitory computer-readable media, such as computer storage media. In some aspects, computer-readable media may include volatile and/or non-volatile, removable and/or non-removable media implemented in any method or technology for storage of information such as computer-readable instructions, data structures, program modules, or other data. Computer-readable media includes, but is not limited to, RAM, ROM, EEPROM, flash memory or other memory technology, CD-ROM, digital versatile disks (DVD), high-definition multimedia/data storage disks, or other optical storage, magnetic cassettes, magnetic tape, magnetic disk storage or other magnetic storage devices, or any other non-transmission medium that can be used to store information for access by a computing device.

The processors 506 and the memory 510 of the computing device 502 may implement an optical scanner control module 512 and a cutting instrument control module 514. The optical scanner control module 512 and the cutting instrument control module 514 may include routines, program instructions, objects, and/or data structures that perform particular tasks or implement particular abstract data types. The memory 510 may also include a data store (not shown) that is used by the optical scanner control module 512 and/or the cutting instrument control module 514.

The optical scanner control module 512 may be configured to generate one or more control signals 516 to initiate an optical scanner to obtain optical measurements of an optical layer of a multi-layer film. In some examples, the optical scanner control module 512 generates the control signals 516 in response to determining that the optical scanner (e.g., optical scanner 216 of FIG. 2) is aligned with at least one cutout (e.g., cutout 212) of the multi-layer film. As discussed above, the determination that the optical scanner is aligned with a cutout may be made by advancing the multi-layer film along the fabrication system in step-wise increments, through use of a vision system to detect the cutouts, and/or through the use of fiducial markers.

The optical scanner control module 512 may also be configured to generate control signals 516 to vary a position of the optical scanner. For example, as discussed above, in some implementations, the optical scanner may be moveable (e.g., along a single axis) to obtain optical measurements at various locations of the optical layer.

As shown in FIG. 5, the optical scanner control module 512 may be configured to receive optical measurements 518 obtained by the optical scanner. The computing device 502 may then determine a rotational orientation for an optical element that is to be cut from the multi-layer film, where the rotational orientation is determined based on the optical measurements 518. The cutting instrument control module 514 may then generate one or more control signals 520 to initiate a cutting instrument (e.g., cutting instrument 218 of FIG. 2) to cut the optical element at the determined rotational orientation.

The processors 506 and the memory 510 of the computing device 502 may implement additional modules that are not explicitly illustrated in FIG. 5. For example, the computing device 502 may include a material feed module for controlling the advancement of the multi-layer film through the fabrication system (e.g., control the tensioning system). The computing device 503 may also include a vacuum control module and/or pick-up/storage module. The vacuum control module may be configured to generate control signals to control a vacuum system at various stages of the fabrication system, whereas the pick-up/storage module may generate control signals for operating a mechanism (e.g., arm with vacuum and/or suction) to pick-up cut optical elements and transfer them to the appropriate storage.

Figure 6:
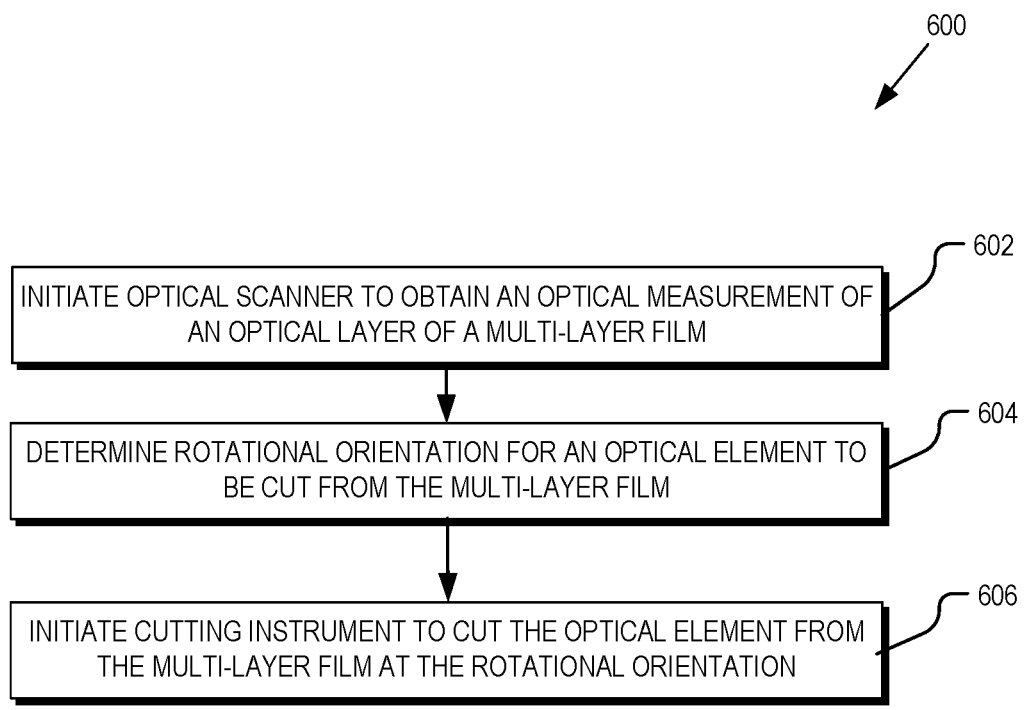
FIG. 6 is a flow chart that illustrates an example process for the fabrication of optical elements with optical scanner feedback, in accordance with aspects of the present disclosure.

FIG. 6 is a flow chart that illustrates an example process 600 for the fabrication of optical elements with optical scanner feedback, in accordance with aspects of the present disclosure. Process 600 is one example process performed by the computing device 214 of FIG. 2 and/or the computing device 502 of FIG. 5. Process 600 will be described with additional reference to FIG. 2.

In process block 602, the computing device 214 initiates the optical scanner 216 to obtain an optical measurement 224 of an optical layer 206 of a multi-layer film 204. Next, in process block 604, the computing device 214 determines a rotational orientation 234 for an optical element (e.g., optical element 230C) that is to be cut from the multi-layer film 204. As discussed above, the determination of the rotational orientation 234 may be based on the optical measurement 224 received from the optical scanner 216. Next, after the multi-layer film 204 has been advanced to a cutting stage, the computing device 214 may initiate the cutting instrument 218 to cut the optical element 230C from the multi-layer film 204 at the rotational orientation 234 (i.e., process block 606).

Embodiments of the invention may include or be implemented in conjunction with an artificial reality system. Artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured (e.g., real-world) content. The artificial reality content may include video, audio, haptic feedback, or some combination thereof, and any of which may be presented in a single channel or in multiple channels (such as stereo video that produces a three-dimensional effect to the viewer). Additionally, in some embodiments, artificial reality may also be associated with applications, products, accessories, services, or some combination thereof, that are used to, e.g., create content in an artificial reality and/or are otherwise used in (e.g., perform activities in) an artificial reality. The artificial reality system that provides the artificial reality content may be implemented on various platforms, including a head-mounted display (HMD) connected to a host computer system, a standalone HMD, a mobile device or computing system, or any other hardware platform capable of providing artificial reality content to one or more viewers.

The term "processor" in this disclosure may include one or more processors, microprocessors, multi-core processors, Application-specific integrated circuits (ASIC), and/or Field Programmable Gate Arrays (FPGAs) to execute operations disclosed herein. In some embodiments, memories (not illustrated) are integrated into the processing logic to store instructions to execute operations and/or store data. Processing logic may also include analog or digital circuitry to perform the operations in accordance with embodiments of the disclosure.

A "memory" or "memories" described in this disclosure may include one or more volatile or non-volatile memory architectures. The "memory" or "memories" may be removable and non-removable media implemented in any method or technology for storage of information such as computer-readable instructions, data structures, program modules, or other data. Example memory technologies may include RAM, ROM, EEPROM, flash memory, CD-ROM, digital versatile disks (DVD), high-definition multimedia/data storage disks, or other optical storage, magnetic cassettes, magnetic tape, magnetic disk storage or other magnetic storage devices, or any other non-transmission medium that can be used to store information for access by a computing device.

A computing device may include a desktop computer, a laptop computer, a tablet, a phablet, a smartphone, a feature phone, a server computer, or otherwise. A server computer may be located remotely in a data center or be stored locally.

The processes explained above are described in terms of computer software and hardware. The techniques described may constitute machine-executable instructions embodied within a tangible or non-transitory machine (e.g., computer) readable storage medium, that when executed by a machine will cause the machine to perform the operations described. Additionally, the processes may be embodied within hardware, such as an application specific integrated circuit ("ASIC") or otherwise.

A tangible non-transitory machine-readable storage medium includes any mechanism that provides (i.e., stores) information in a form accessible by a machine (e.g., a computer, network device, personal digital assistant, manufacturing tool, any device with a set of one or more processors, etc.). For example, a machine-readable storage medium includes recordable/non-recordable media (e.g., read only memory (ROM), random access memory (RAM), magnetic disk storage media, optical storage media, flash memory devices, etc.).

The above description of illustrated embodiments of the invention, including what is described in the Abstract, is not intended to be exhaustive or to limit the invention to the precise forms disclosed. While specific embodiments of, and examples for, the invention are described herein for illustrative purposes, various modifications are possible within the scope of the invention, as those skilled in the relevant art will recognize.

These modifications can be made to the invention in light of the above detailed description. The terms used in the following claims should not be construed to limit the invention to the specific embodiments disclosed in the specification. Rather, the scope of the invention is to be determined entirely by the following claims, which are to be construed in accordance with established doctrines of claim interpretation.

What is claimed is:

1. A computer-implemented optical element fabrication method comprising:
   initiating an optical scanner to obtain an optical measurement of an optical layer of a multi-layer film, wherein the multi-layer film comprises a liner layer adhered to the optical layer, and wherein the optical scanner is configured to generate a beam of light that is not incident upon the liner layer to obtain the optical measurement of the optical layer, wherein the liner layer comprises one or more cutouts to allow the beam of light to be incident upon the optical layer and not the liner layer;
   determining a rotational orientation for an optical element to be cut from the multi-layer film based on the optical measurement; and
   initiating a cutting instrument to cut the optical element from the multi-layer film at the rotational orientation.

2. The computer-implemented optical element fabrication method of claim 1, wherein initiating the optical scanner to obtain the optical measurement includes determining whether the optical scanner is aligned with the one or more cutouts.

3. The computer-implemented optical element fabrication method of claim 1, further comprising:
   initiating the optical scanner to obtain an additional optical measurement at a subsequent location of the optical layer;
   determining an adjusted rotational orientation for a subsequent optical element to be cut from the multi-layer film in response to the additional optical measurement; and
   initiating the cutting instrument to cut the subsequent optical element from the multi-layer film at the adjusted rotational orientation.

4. The computer-implemented optical element fabrication method of claim 1, further comprising:
   determining an optical axis of the optical layer based on the optical measurement, wherein determining the rotational orientation is based on the optical axis.

5. The computer-implemented optical element fabrication method of claim 4, wherein the optical axis is at least one of a polarization axis or a retardation axis of the optical layer.

6. The computer-implemented optical element fabrication method of claim 4, wherein the optical axis of the optical layer is at a first angle with respect to a reference edge of the multi-layer film, and wherein the rotational orientation is determined such that an optical axis of the optical element is at a second angle with respect to a reference edge of the optical element, wherein the first angle is different from the second angle.

7. The computer-implemented optical element fabrication method of claim 1, wherein the optical measurement comprises a Mueller matrix.

8. A computing device configured to support optical element fabrication, comprising:
   at least one processor; and
   at least one memory coupled to the at least one processor, the at least one memory having instructions stored therein, which when executed by the at least one processor, direct the computing device to:
   initiate an optical scanner to obtain an optical measurement of an optical layer of a multi-layer film, wherein the multi-layer film comprises a liner layer adhered to the optical layer, wherein the liner layer comprises one or more cutouts;
   determine whether the optical scanner is aligned with the one or more cutouts;
   initiate the optical scanner to direct a beam of light through the one or more cutouts such that the beam of light is incident upon the optical layer and not the liner layer to obtain the optical measurement;
   determine a rotational orientation for an optical element to be cut from the multi-layer film based on the optical measurement; and
   initiate a cutting instrument to cut the optical element from the multi-layer film at the rotational orientation.

9. The computing device of claim 8, wherein the at least one memory further comprises instructions to direct the computing device to:
   initiate the optical scanner to obtain an additional optical measurement at a subsequent location of the optical layer;
   determine an adjusted rotational orientation for a subsequent optical element to be cut from the multi-layer film in response to the additional optical measurement; and
   initiate the cutting instrument to cut the subsequent optical element from the multi-layer film at the adjusted rotational orientation.

10. The computing device of claim 8, wherein the at least one memory further comprises instructions to direct the computing device to:
    determine an optical axis of the optical layer based on the optical measurement, wherein determining the rotational orientation is based on the optical axis.

11. The computing device of claim 10, wherein the optical axis is at least one of a polarization axis or a retardation axis of the optical layer.

12. The computing device of claim 10, wherein the optical measurement comprises a Mueller matrix.

13. An optical element fabrication system, comprising:
    an optical scanner configured to obtain an optical measurement of an optical layer of a multi-layer film, wherein the multi-layer film comprises a liner layer adhered to the optical layer, the liner layer comprising one or more cutouts, and wherein the optical scanner is configured to direct a beam of light through the one or more cutouts such that the beam of light is incident upon the optical layer and not the liner layer to obtain the optical measurement;
    a computing device communicatively coupled to the optical scanner to receive the optical measurement and to determine a rotational orientation for an optical element to be cut from the multi-layer film based on the optical measurement; and
    a cutting instrument communicatively coupled to the computing device and configured to cut the optical element from the multi-layer film at the rotational orientation.

14. The optical element fabrication system of claim 13, wherein the computing device is further configured to:

determine an optical axis of the optical layer based on the optical measurement, wherein the rotational orientation is determined based on the optical axis.

15. The optical element fabrication system of claim 14, wherein the optical axis is at least one of a polarization axis or a retardation axis of the optical layer.

16. The optical element fabrication system of claim 14, wherein the optical measurement comprises a Mueller matrix.

\* \* \* \* \*